J. L. HULBERT.
MILKING MACHINE PULSATOR.
APPLICATION FILED SEPT. 30, 1920.
1,392,570.
Patented Oct. 4, 1921.
2 SHEETS—SHEET 1.
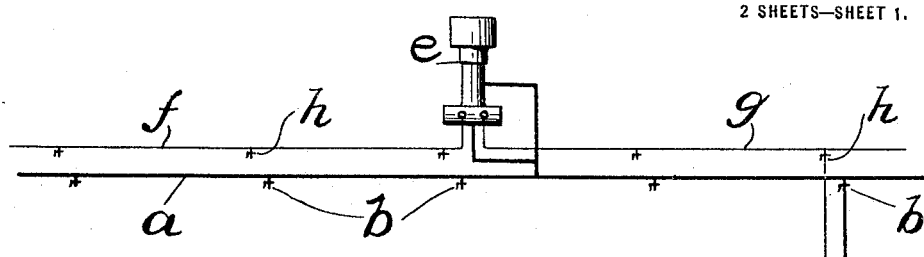
FIG.1.
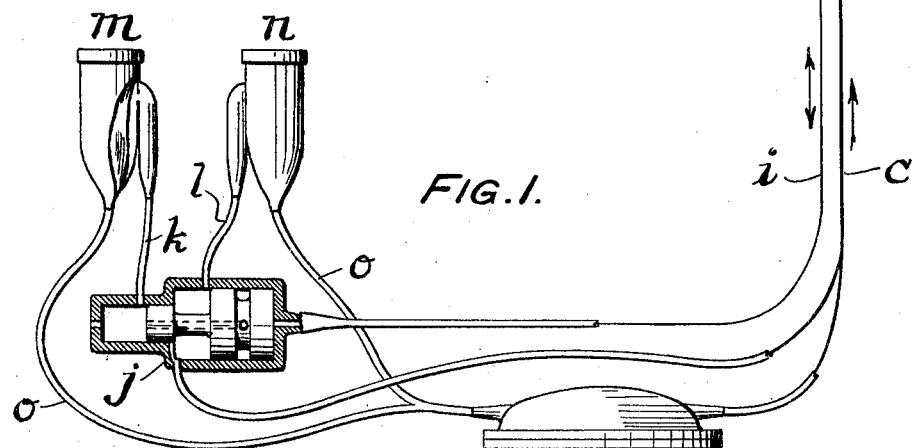
FIG.2.
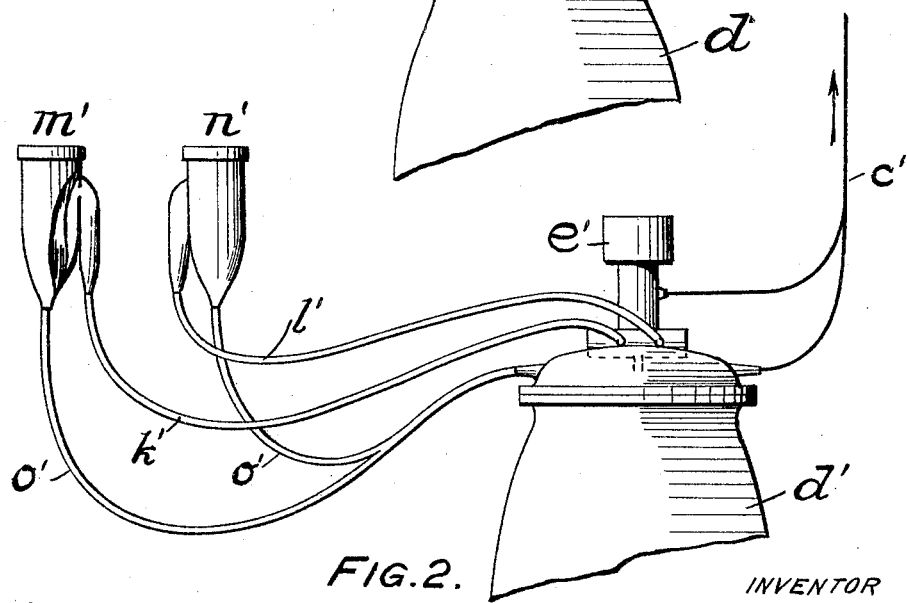
WITNESS:
Robt P Kitchel
INVENTOR
John L. Hulbert
BY
Frank L. Busser
ATTORNEY.

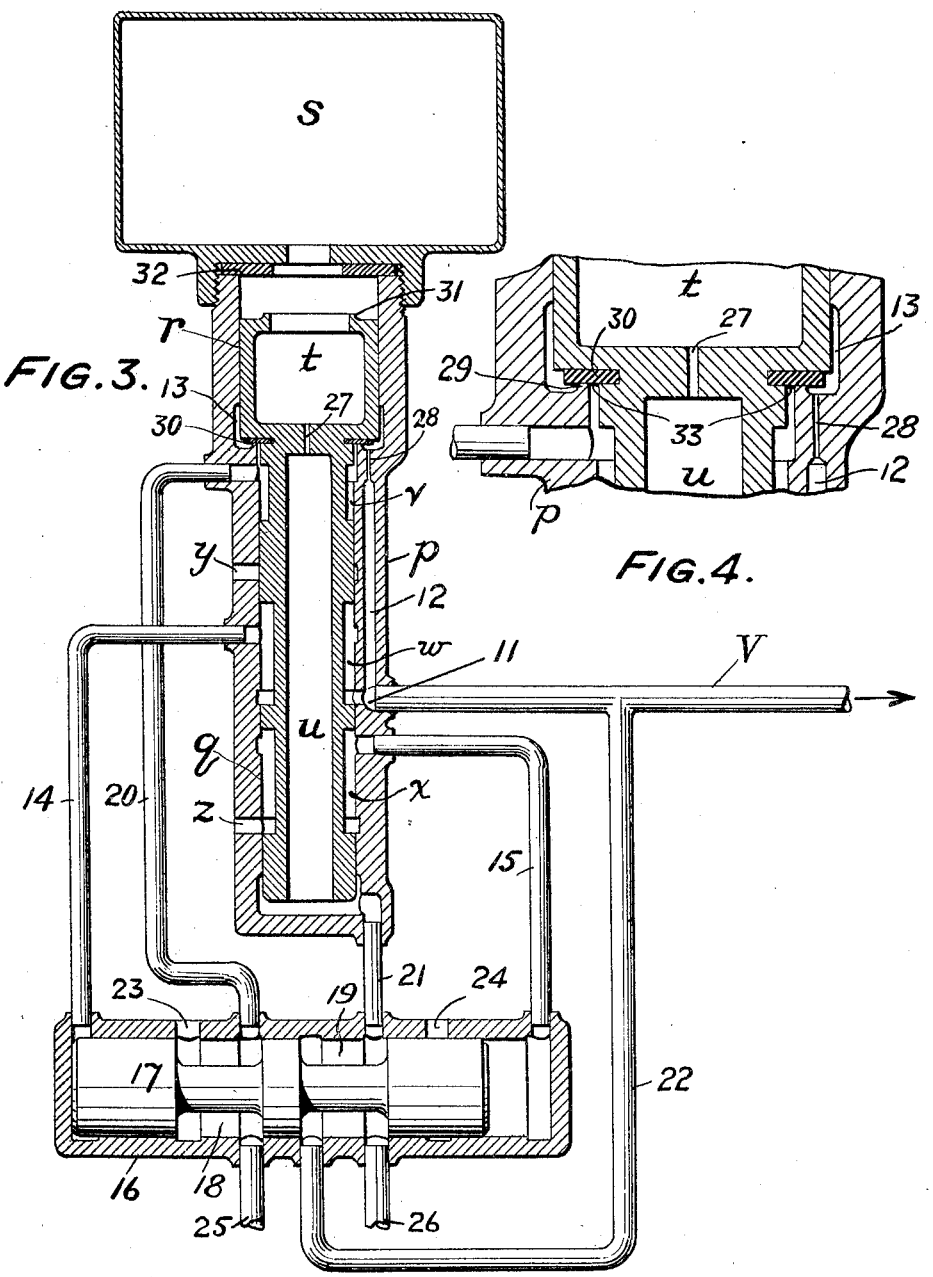

UNITED STATES PATENT OFFICE.

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE PULSATOR.

1,392,570.  Specification of Letters Patent.  Patented Oct. 4, 1921.

Application filed September 30, 1920. Serial No. 413,679.

*To all whom it may concern:*

Be it known that I, JOHN L. HULBERT, a citizen of the United States, residing at Poughkeepsie, county of Dutchess, and State of New York, have invented a new and useful Improvement in Milking-Machine Pulsators, of which the following is a full, clear, and exact description, reference being had to the accompanying drawings, which form a part of this specification.

My invention relates to milking machine pulsators. The object of my invention is to provide a pneumatically operated pulsator, free from springs, liquids, or dash pots, that will pulsate at a uniform speed under varying conditions. My pulsator is adaptable for use as a master pulsator to provide, in a pulsation pipe line, pneumatic pulsations that will control secondary pulsators, which are located close to the teat cups, and cause pulsations that operate such cups, or for use as an independent pulsator, in each milking machine unit, for direct operation of the teat cups.

In the accompanying drawings which illustrate an embodiment of my invention,—

Figure 1 shows a complete installation, using my pulsator as a master pulsator.

Fig. 2 shows a single unit, having my pulsator built into the pail cover.

Fig. 3 is a diagrammatic representation of my pulsator.

Fig. 4 is an enlarged drawing of a part of Fig. 3.

Referring particularly to Fig. 1, $a$ is a vacuum pipe line having several cocks $b$, to which may be attached flexible tubes $c$, leading to a milk pail $d$. $e$ is the pulsator, embodying my invention, which supplies master pulsations to pulsation pipe lines $f$ and $g$, each of which is provided with several cocks $h$, adaptable for connection by flexible tubes $i$ with secondary pulsators $j$, which may be of any convenient type, as, for example, the type shown incorporated in the pail cover in Leitch Patent No. 1,196,000. The pulsator $j$ is connected by flexible tubes $k$ and $l$ with the inflation chambers of double chamber teat cups $m$ and $n$. The inner chambers of these cups are connected by pipes $o$ with the pail $d$.

Referring to Fig. 2: $c'$ is a flexible pipe for connecting the milk pail $d'$ with a vacuum pipe line not shown. $e'$ is a pulsator embodying my invention, built into the pail top. $k'$ and $l'$ are flexible tubes connecting the pulsator with the inflation chambers of teat cups $m'$ and $n'$. The inner chamber of these cups are connected by pipes $o'$ with the pail $d'$.

Referring to Figs. 3 and 4: $p$ is a control cylinder, having a small bore $q$ and a large bore $r$, the latter of which is connected with a variable pressure chamber $s$. A ridge 29 around the upper end of the cylinder bore $q$ projects above the bottom of the large bore $q$. In this cylinder reciprocates a piston, having a large diameter portion $t$ adapted to fit the large bore of the cylinder and a smaller diameter portion $u$ adapted to fit the small bore of the cylinder. Against the shoulder at the lower end of the large diameter portion $t$ is a soft packing washer 30 adapted to make a tight joint against the ridge 29. The upper end of the piston has a ridge 31 adapted to make a tight joint against a soft packing ring 32 at the upper end of the cylinder. Around the small diameter of the piston are three annular grooves $v$, $w$ and $x$. Two ports $y$ and $z$ through the wall of the small diameter cylinder provide inlets for air at atmospheric pressure. A port 11 communicates with a pipe V connected with suction, the absolute pressure being less than (usually about half of) atmospheric and being hereinafter referred to as vacuum. A passage 12 leads from the vacuum port to an annular space 13 at the lower end of the large diameter portion of the cylinder, and outside of the ridge 29. Ports and passages 14 and 15 lead from the sides of the small diameter bore $q$ to the ends of a pulsator cylinder 16 in which reciprocates a piston 17, having around it two annular grooves 18 and 19. From the cylinder 16, a port and passage 20 lead to the upper end of the small bore $q$ and a port and passage 21 lead to the lower end of the same cylinder. A port and passage 22 connect the cylinder 16 with the vacuum pipe V. Two ports 23 and 24 provide atmospheric inlets to this cylinder. Two other ports 25 and 26 are adapted for connection with pulsation pipes, as $f$ and $g$ or $k'$ and $l'$. In a plug between the bores of the large and small diameter portions of the piston $p$ there is a restricted or calibrated passage 27. Between passage 12 and the annular space 13, there is another restricted or calibrated passage 28.

With the parts in the position shown, the left end of cylinder 16 is connected, by passage and port 14, annular space $w$, port 11 and pipe V, with vacuum, while the right hand end of the same cylinder receives air at atmospheric pressure through port $v$, annular space $x$, and port and passage 15. The piston 17 is therefore held to the left. Atmospheric pressure is admitted, through port 23, annular space 18, and passage 20, to the upper end of the small bore $q$ and presses against an annular area 33 at the lower end of the large portion $t$ of the piston. At the same time air is exhausted, by port 22, annular passage 19, and port 21, from the lower end of the bore $q$, and slowly through the restricted passage 27 from the larger bore $r$ and the air chamber $s$.

The piston $t$—$u$ is now under the influence of three upward pressures, namely: atmospheric on the annular area 33, vacuum on the annular area communicating with the space 13 and vacuum on the lower end of the small piston $u$; and is subjected to a gradually decreasing intermediate downward pressure on the upper end of the large diameter piston $t$. When the pressure on the upper end of the large piston $t$ becomes small enough, the upward pressures in area 33 will overcome the downward pressures and will cause the piston to move upward; and as soon as the piston starts upward, atmospheric pressure is admitted to the annular space 13 from passage 20 and causes the piston to complete its stroke quickly.

The restricted passage 28 is so small in proportion to the passage 20 that its effect on the pressure is negligible, but is large enough to remove all air that may leak between the ridge 29 and soft washer 30.

The right hand end of the cylinder 16 is now connected, by passage 15, annular space $x$ and port 11, with the vacuum pipe V; while air at atmospheric pressure is admitted, through port $y$, annular space $w$ and passage 14, to the left hand end of the cylinder, forcing the piston 17 to the right. The upper end of the small bore $q$ is now connected, by passage 20, annular space 18, and passage 22, with the vacuum pipe V. Atmospheric pressure, entering through port 24, annular space 19 and passage 21, fills the lower end of the bore $q$ and, through the restricted passage 27, slowly fills the chamber $s$.

The piston $t$—$u$ is now under the influence of two upward pressures, namely: atmospheric on the lower end of the small portion $u$ of the piston and vacuum on the annular lower end of the large portion $t$ of the piston; and is subjected to two downward pressures, namely: that of the vacuum on the annular part outside of the ridge 31 on the upper end of the large portion $t$ of the piston and an intermediate pressure on the center of the large portion $t$ of the piston through passage 27. Any air that may leak between the ridge 31 and the soft packing 32 is removed through passage 28 to pipe V. When the pressure in the chamber $s$ and on the center of the piston $t$ becomes sufficiently high, it starts the piston downward; and as soon as the piston begins to move the same pressure is admitted to an annular area outside of the ridge 31, causing a quick completion of the stroke. The first described connections with the cylinder 16 are now restored, the piston 17 moves to the left, and the cycle is repeated.

With the piston valve 17 in the position shown, air is admitted to passage 25 and exhausted from passage 26. With the piston valve 17 moved to the right, air is admitted to passage 26 and exhausted from passage 25.

From the above description it may be understood that I have provided a pulsator in which the control piston is, at all times, under the influence of several opposing pressures, part of them uniform and one of them gradually increasing or decreasing so as to change the resultant pressure from one direction to the other. The initial movement of the piston occurs soon after the instant of equilibrium and causes opening of communication from a space of higher pressure to one of lower pressure. The increase of pressure causes a great preponderance of pressure in the direction of movement and a quick completion of the stroke.

The change in pressure required in the chamber $s$ before initial movement of the control piston $t$—$u$ depends on the relative area inside and outside of the ridges 29 and 31. These areas are preferably such that the pressure changes through nearly the whole range from atmospheric to vacuum. The rate of change of this pressure depends on the size of the restricted port 27 and of the chamber $s$. By manipulation of the above sizes any desired rate of pulsation may be obtained. It has been found that the operation of this pulsator is quite uniform throughout a wide range of vacuum or variation of friction in the machine.

Having now fully described my invention, what I claim and desire to protect by Letters Patent is:—

1. In a milking machine pulsator, in combination, a pulsation member comprising a cylinder, a piston reciprocable therein, and ports and passages, whereby the piston in its movements supplies alternating pneumatic pulsations; and a control member comprising a variable pressure chamber, a cylinder supplied with alternating pulsations from the pulsation member, a piston reciprocable in the control cylinder, ports and passages whereby the control piston in its movements supplies alternating pulsations to operate the pulsation piston, said control piston being, at any instant, under the influence of two or more unbalanced uniform pressures and one gradually variable pressure.

2. In a control member for a pneumatically operable milking machine pulsator, in combination, a cylinder, a piston reciprocable therein by pneumatic pressures, means to divide the area subjected to pressure in the direction of future movement into two or more parts under the influences of different pressures, and means whereby initial movement of the piston opens communication from the higher pressure to the lower pressure, thus greatly increasing the moving force.

3. In a control member for a pneumatically operatable milking machine pulsator, in combination, a cylinder and a piston reciprocable therein by opposing pneumatic pressures on several areas, one of said pressures being gradually variable so as to reverse the direction of the resultant pressure, and means for varying said pressure.

4. In a control member for a pneumatically operatable milking machine pulsator, in combination, a cylinder and a piston reciprocable therein by opposing pneumatic pressures on several areas, means for gradually varying one of said pressures to cause the resultant pressures to change from one tending to retain the piston at one end of the cylinder to one tending to force it to the opposite end.

5. In a control member for a pneumatically operatable milking machine pulsator, a cylinder, a piston reciprocable therein by opposing pneumatic pressures, there being a higher pressure and a lower pressure tending to cause movement and a pressure opposing movement, means for gradually varying one of said three pressures to change the resultant from one opposing movement to one to cause movement, and means whereby initial movement of the piston opens communication from the higher pressure to the lower pressure to cause quick completion of the movement.

6. In a control member for a pneumatically operable milking machine pulsator, a cylinder, a piston reciprocable therein by opposing pneumatic pressure, there being a higher pressure and a lower pressure tending to cause movement and a pressure opposing movement, means to remove from said lower pressure space any leakage from said higher pressure space, one of said three pressures being gradually variable to change the resultant pressure from one opposing movement to one to cause movement, means to vary said pressure, and means whereby initial movement of the piston opens communication from said higher pressure space to said lower pressure space to cause a quick completion of the movement.

7. In a pneumatically operable milking machine pulsator, two cylinders, a piston reciprocable in each, ports and passages whereby each cylinder reverses pressure connections for the other, the first piston being freely reciprocable, the second piston being, immediately after the movement of the first, under the influence of three or more pressures on as many areas on the opposite ends of the piston, the resultant pressure being opposed to movement, means to gradually vary one of said pressures until the resultant pressure causes movement, and means whereby initial movement of the piston admits air from a high pressure area to a low pressure area to cause a quick completion of the movement.

8. A control member for a milking machine pulsator having a movable element under the influence of two pressures on different areas tending to cause movement and another pressure tending to oppose movement, the resultant being initially to oppose movement, means for gradually varying one pressure so that the resultant eventually causes movement, and means whereby initial movement of the element admits higher pressure against one of the areas tending to cause movement and thus causes quick completion of the movement.

9. A pulsator having an air chamber, a movable member exposed on one side to the air chamber and on the other side to pressure of a maximum or a minimum degree, and adapted to move only when nearly a maximum or a minimum state of pressure exists in the air chamber, thereby eliminating speed variation due to variable friction of the movable member, and means for gradually varying the pressure in the chamber.

10. In a milking machine pulsator, a control member having a movable element under the influence of opposing pneumatic pressures, the resultant of which is initially opposed to movement, one of said pressures being variable so as to cause the resultant pressure to ultimately cause movement, and means for causing the variation in pressure.

11. In a control member for a pneumatically operable milking machine pulsator, a cylinder, a piston therein having a plurality of pressure surfaces pneumatic pressure against either of which tends to shift the piston in one direction, means to create an opposing pneumatic pressure preventing such shift and then to reduce said opposing pressure to allow the pressure against one of said surfaces to start said shift, and means causing the last named pressure, after said shift is started, to operate also against the other pressure surfaces, thereby accelerating the shift.

12. In a milking machine pulsator, in combination, a pulsator member comprising a cylinder and piston, a control member comprising a cylinder and piston, ports and passages connecting the two cylinders, and means controlled by each piston in its movement to effect, through said ports and passages, a movement of the other piston, said ports including a restricted calibrated opening permitting, but obstructing, the flow of pressure fluid required to effect the shift of the piston of the control member, thereby causing a pronounced and regulatable dwell of the control piston before shifting.

13. In a milking machine pulsator, in combination, a pulsator member comprising a cylinder and piston, a control member comprising a cylinder and piston, ports and passages connecting the two cylinders, and means controlled by each piston in its movement to effect, through said ports and passages, a movement of the other piston, said ports including a restricted calibrated opening permitting, but obstructing, the flow of pressure fluid required to effect the shift of the piston of the control member, whereby such piston starts to shift when the effective pressure on one side thereof slightly exceeds the effective pressure on the other side, and means, operable immediately after the start of such shift, to suddenly and substantially increase the pressure on the first side, thereby effecting a quick shift of the control piston.

14. In a control device for a pneumatically operable milking machine pulsator, a cylinder, a piston having opposing surfaces, means for supplying differential pressures, a valve device, passages connecting the valve device and the control device, said connections being so arranged that the shifting of one device will change the connections to shift the other device, and a calibrated opening in the connections to one side of the piston of the control device to time the shifting of the control device after the valve has been shifted.

15. In a pulsator for milking machines, a moving element having two surfaces arranged to be acted on by pneumatic pressure, a high pressure supply, a low pressure supply, a valve for admitting low pressure to one surface and high pressure to the other surface and for reversing said connections, an air chamber of a predetermined volume in direct communication with one of said surfaces, and a calibrated opening in the pressure supply connections for said last mentioned surface to gradually vary the pressure in the air chamber with relation to that acting on the other surface to cause the shifting of the element, and connections controlled by the shifting of the element to shift the valve.

16. In a pulsator for milking machines, a moving element having two surfaces arranged to be acted on by pneumatic pressure, a high pressure supply, a low pressure supply, a valve for admitting low pressure to one surface and high pressure to the other surface and for reversing said connections, an air chamber of a predetermined volume in direct communication with one of said surfaces, and a calibrated opening in the pressure supply connections for said last mentioned surface to gradually vary the pressure in the air chamber with relation to that acting on the other surface to cause the shifting of the element, connections controlled by the shifting of the element to shift the valve, and means for increasing the effective area of either surface after the moving element has been slightly shifted.

17. In a milking machine pulsator, a control member having a movable element under the influence of opposing pneumatic pressures, the resultant of which is initially opposed to movement, one of said pressures being variable so as to cause the resultant pressure to ultimately cause movement, means for causing the variation in pressure, and means to remove leakage pressure tending to cause premature movement.

In testimony of which invention, I have hereunto set my hand, at Poughkeepsie, N. Y., on this 18 day of September, 1920.

JOHN L. HULBERT.